Figure 1:
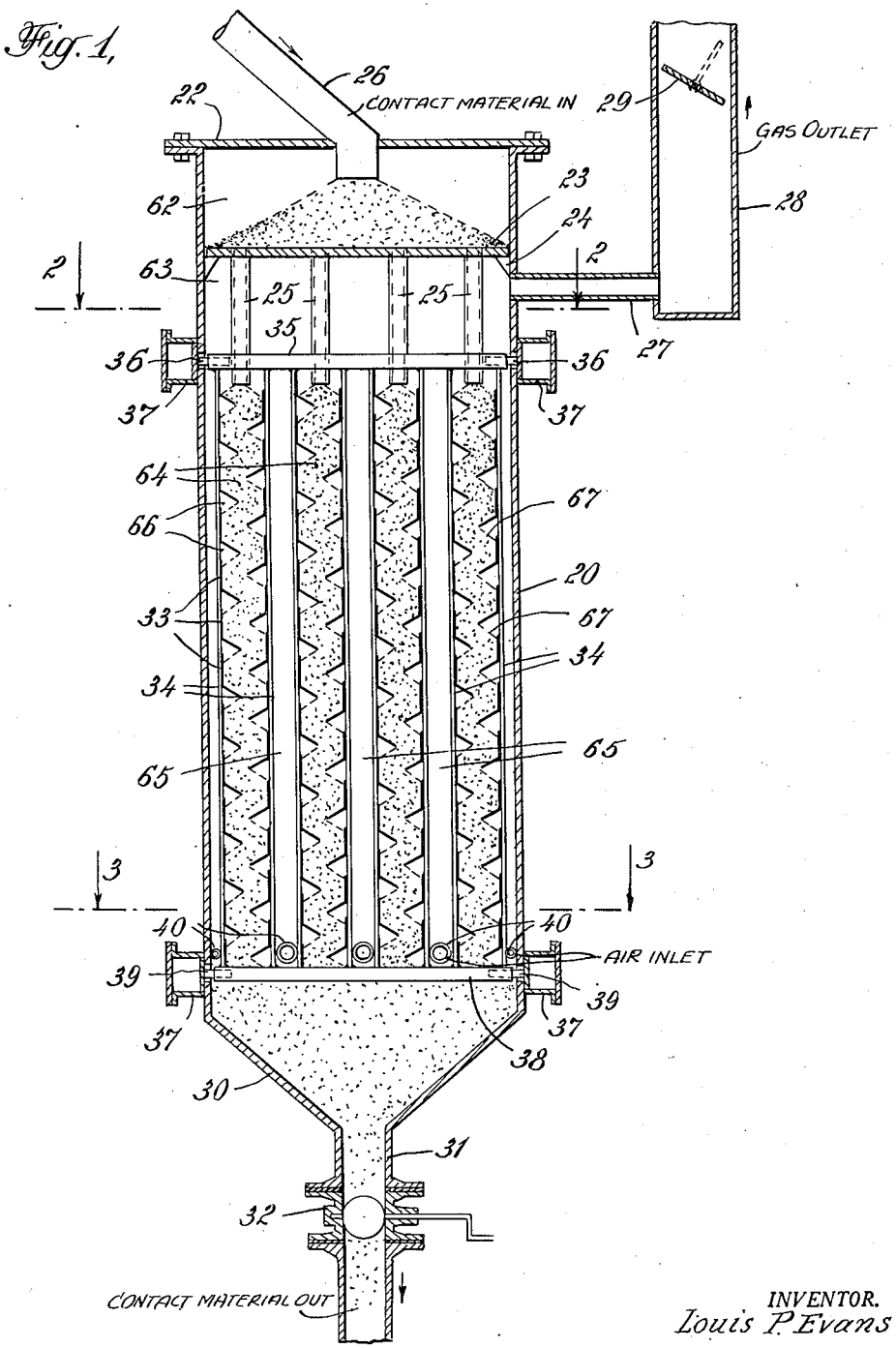

Jan. 4, 1949.   L. P. EVANS   2,458,356
METHOD AND APPARATUS FOR BURNING CONTAMINANTS
FROM A MOVING BED CONTACT MASS
Filed Feb. 19, 1944   10 Sheets-Sheet 1

INVENTOR.
Louis P. Evans
BY
Myron J. Burkhard
ATTORNEY.

INVENTOR.
Louis P. Evans
ATTORNEY.

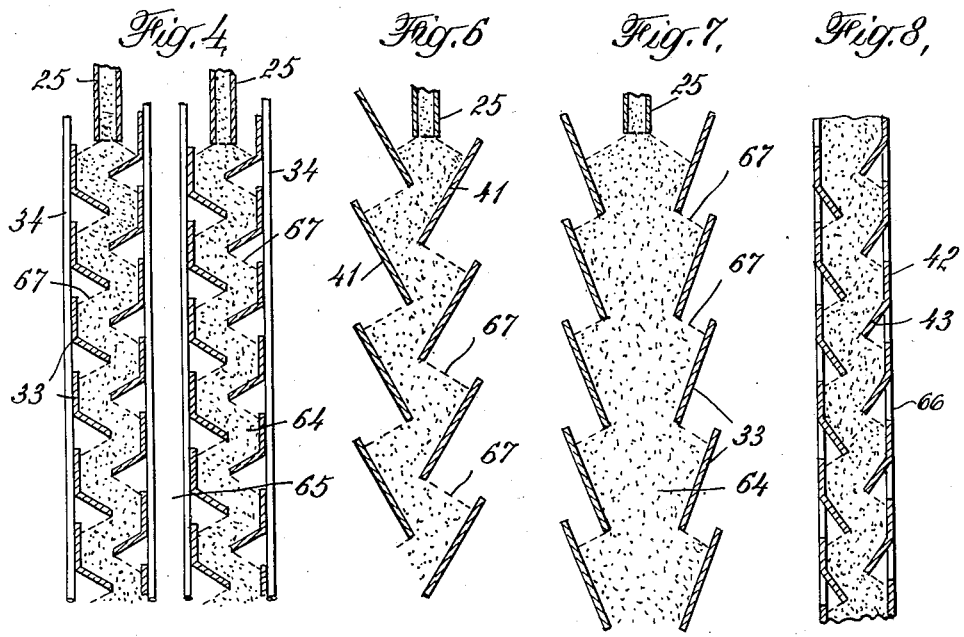
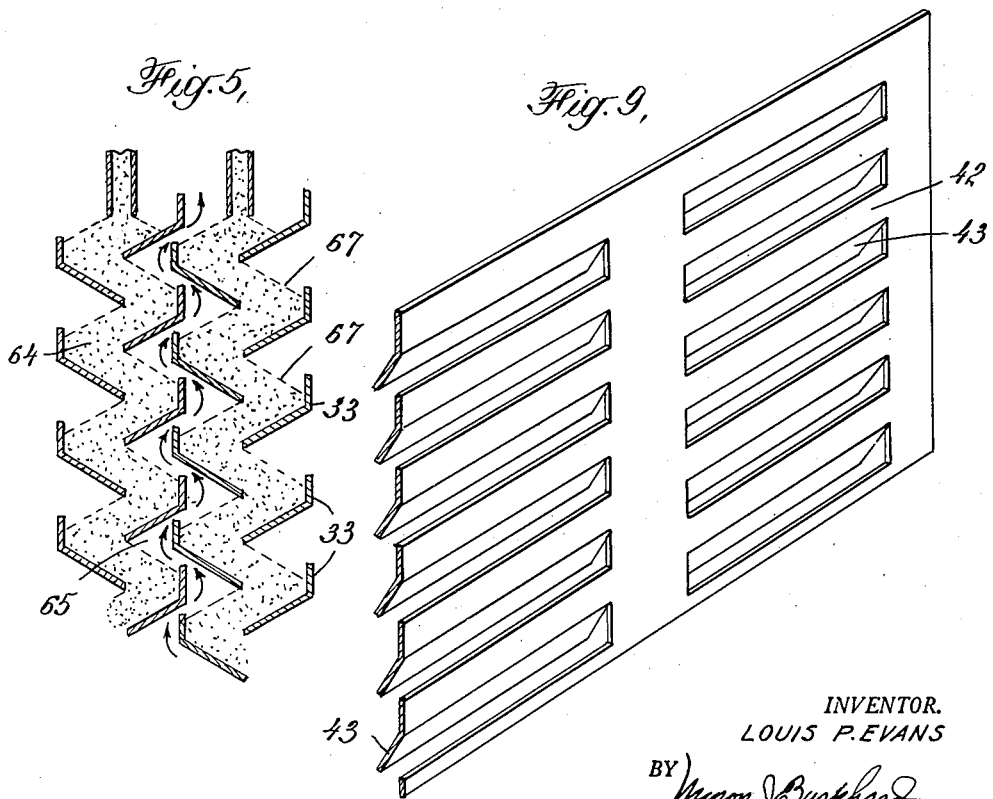

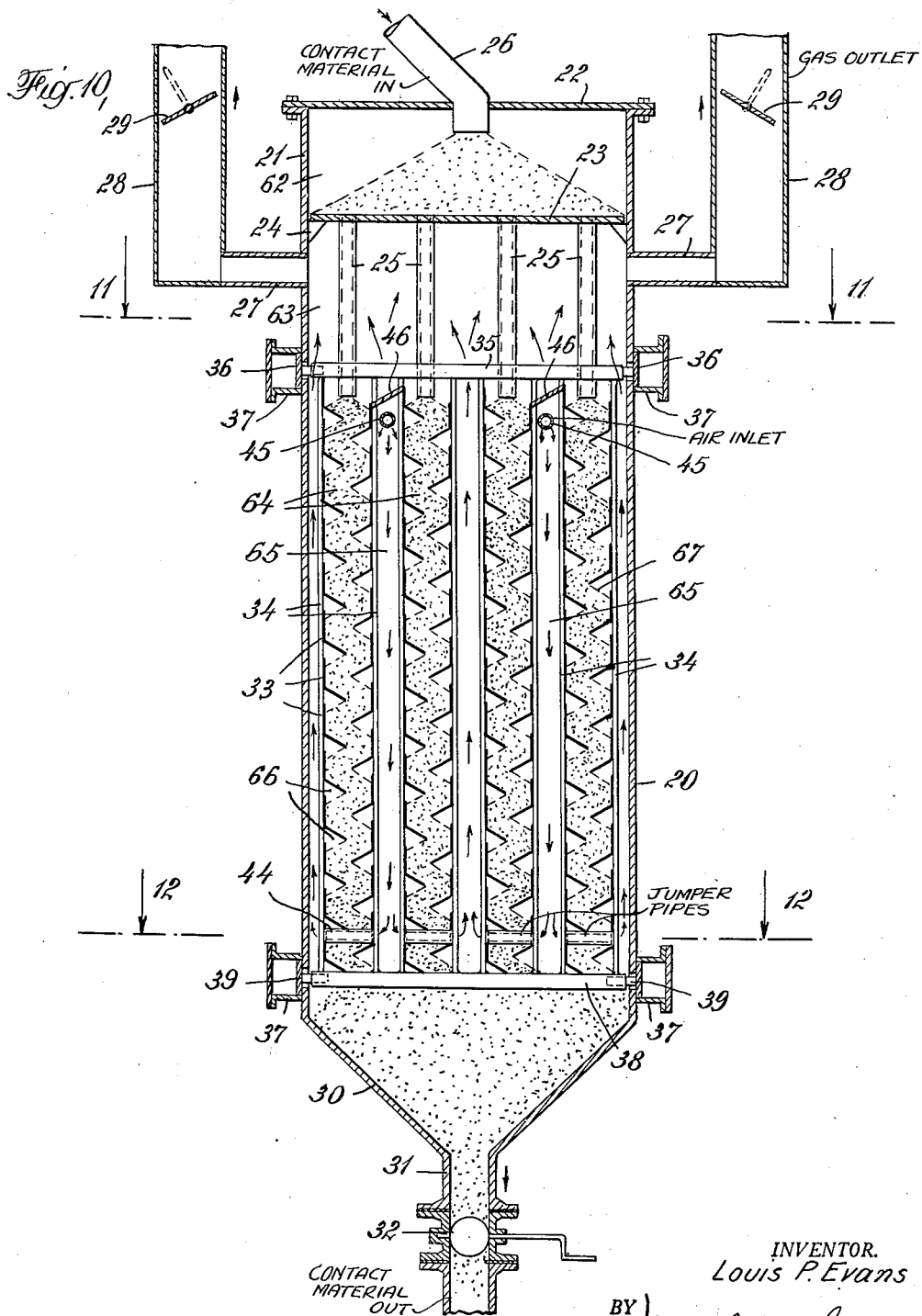

Jan. 4, 1949. L. P. EVANS 2,458,356
METHOD AND APPARATUS FOR BURNING CONTAMINANTS
FROM A MOVING BED CONTACT MASS
Filed Feb. 19, 1944 10 Sheets-Sheet 5

INVENTOR.
Louis P. Evans
BY
ATTORNEY.

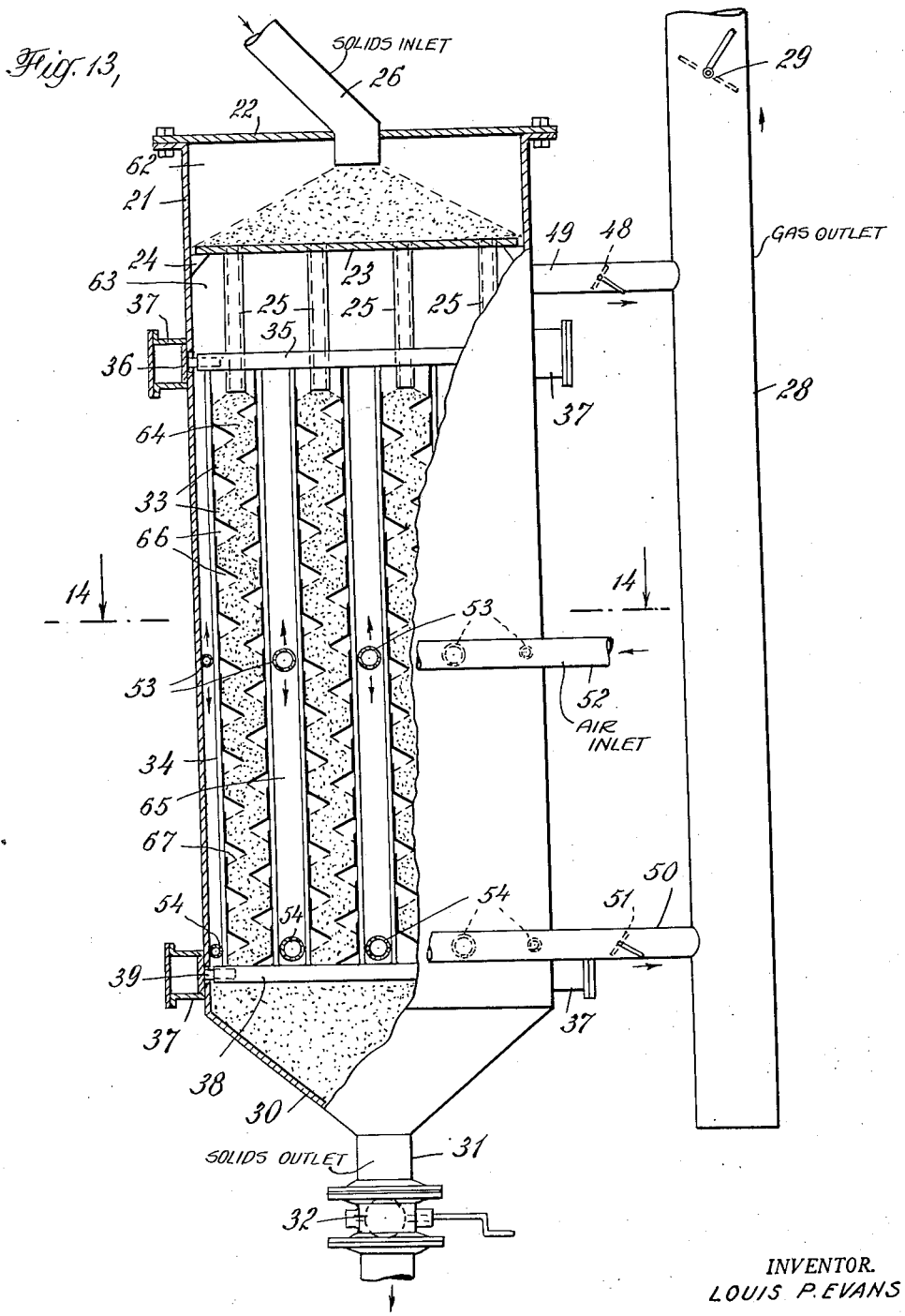

Jan. 4, 1949.   L. P. EVANS   2,458,356
METHOD AND APPARATUS FOR BURNING CONTAMINANTS
FROM A MOVING BED CONTACT MASS
Filed Feb. 19, 1944   10 Sheets-Sheet 7
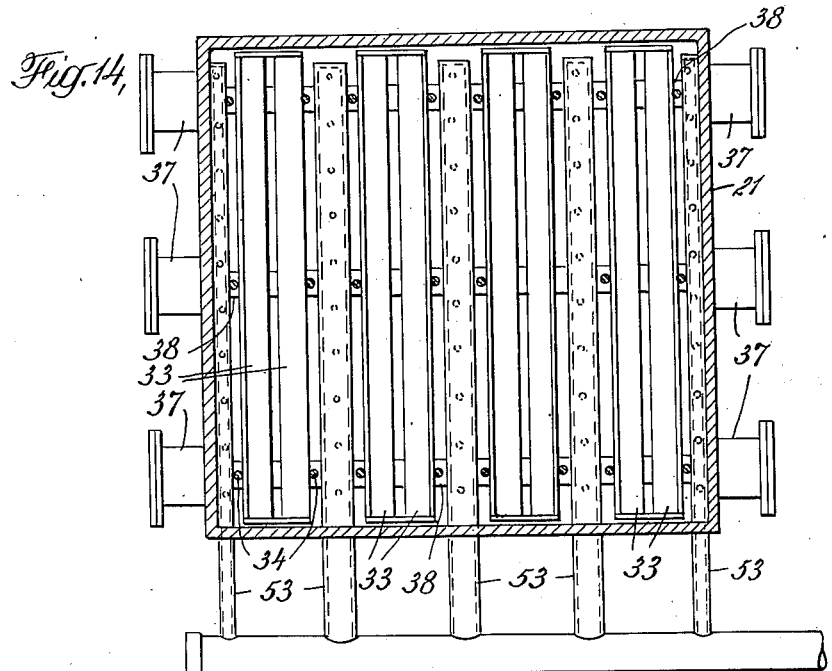
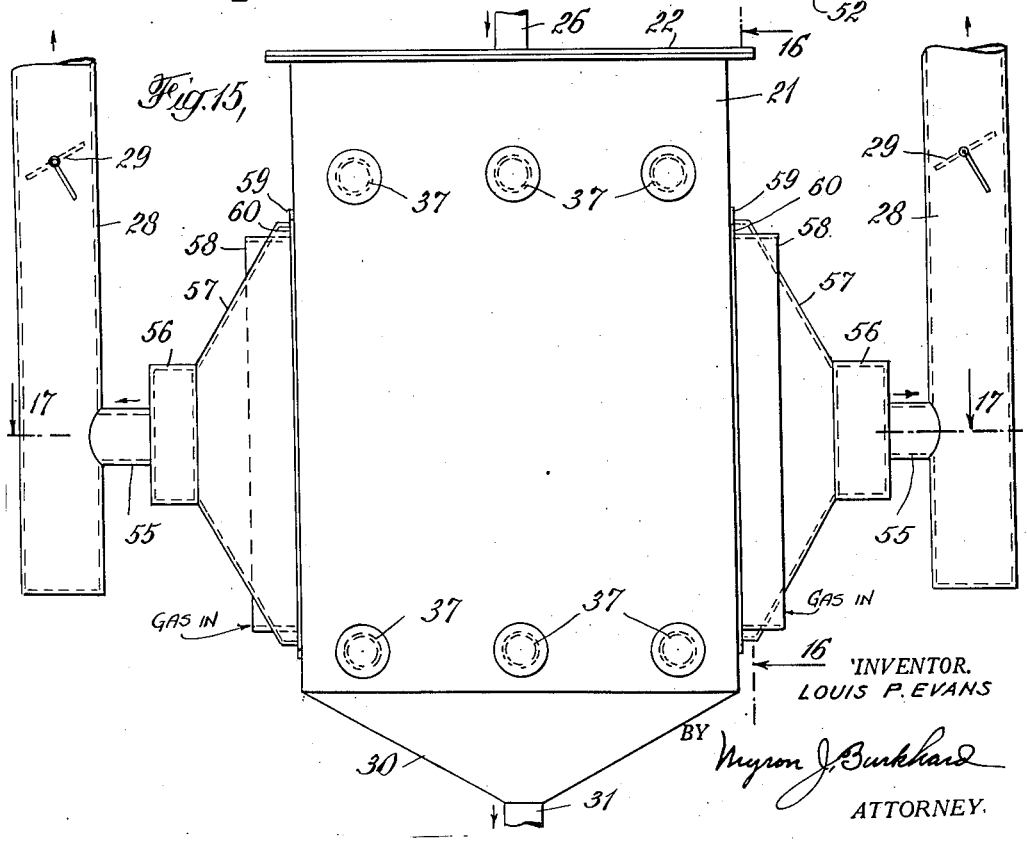
INVENTOR.
LOUIS P. EVANS
BY Myron J. Burkhard
ATTORNEY.

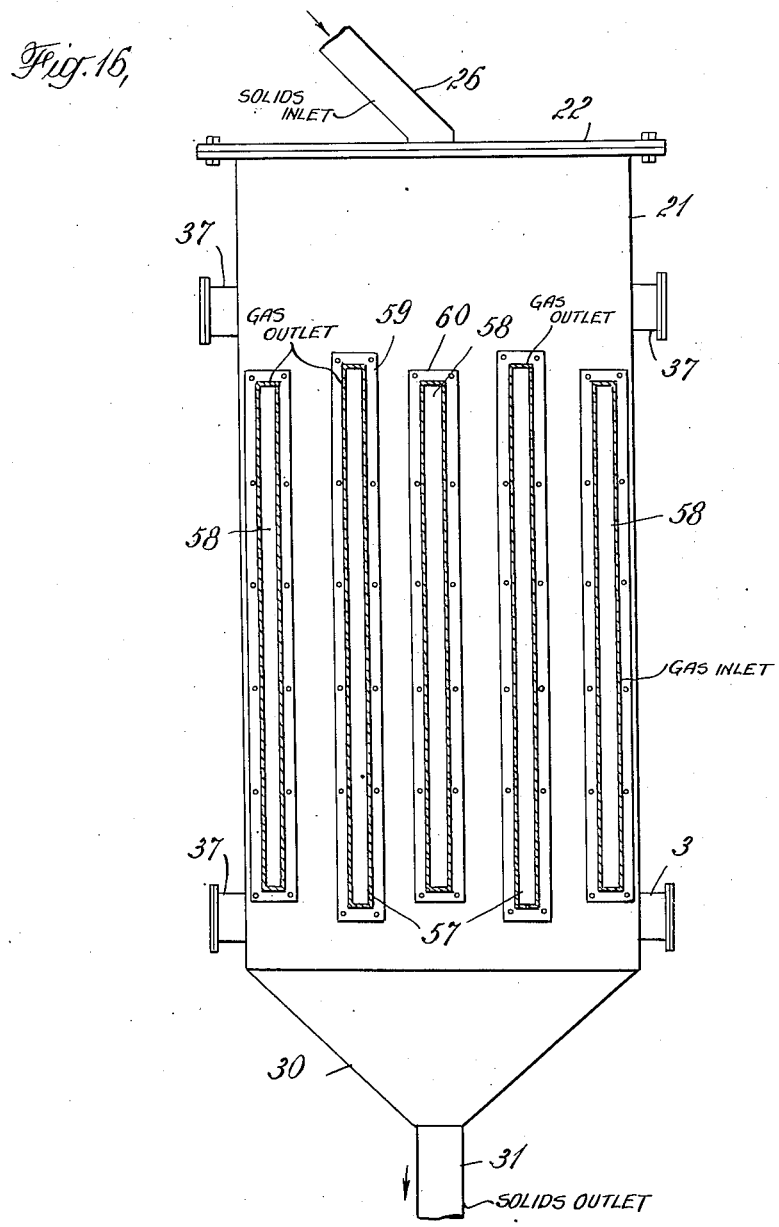

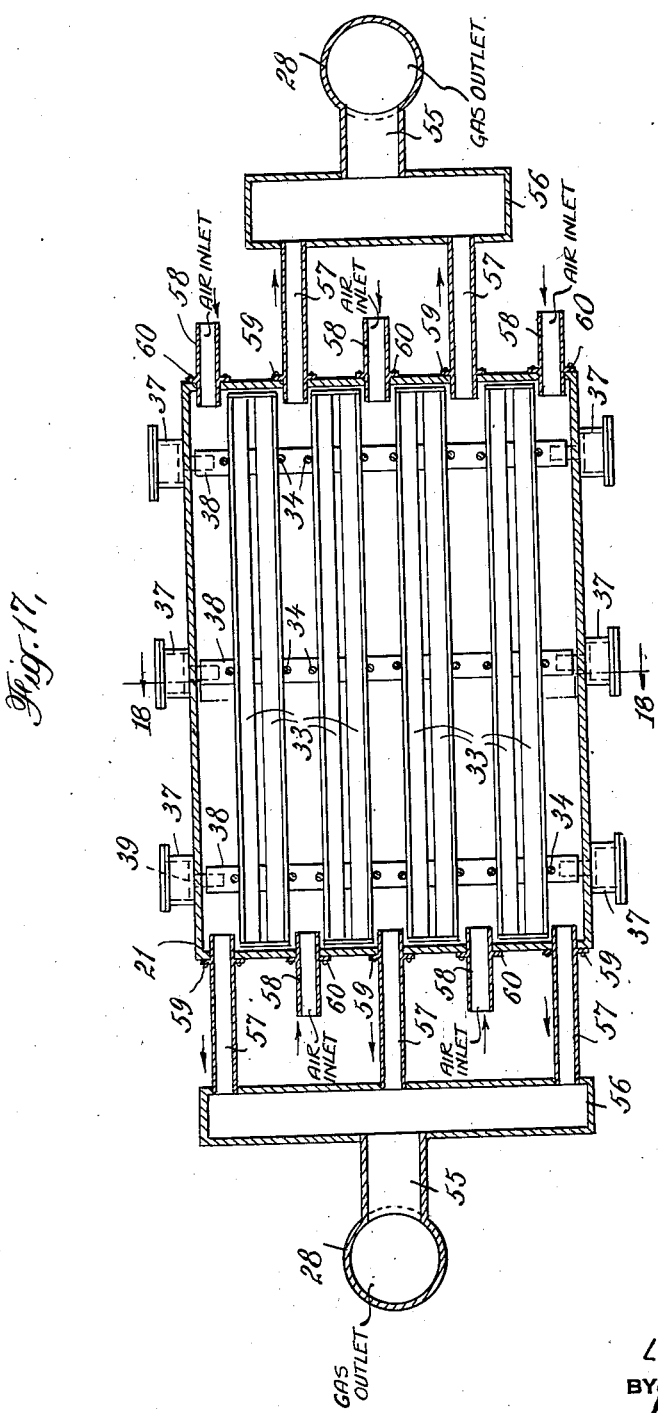

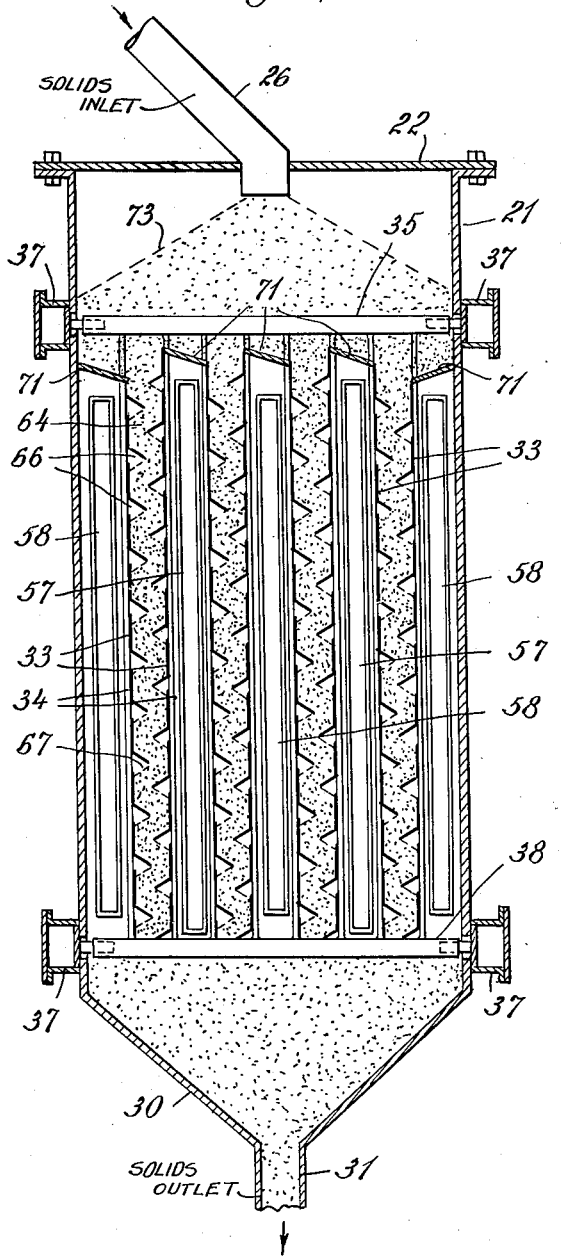

Patented Jan. 4, 1949

2,458,356

UNITED STATES PATENT OFFICE 2,458,356

METHOD AND APPARATUS FOR BURNING CONTAMINANTS FROM A MOVING BED CONTACT MASS

Louis P. Evans, Woodbury, N. J., assignor to Socony-Vacuum Oil Company, Incorporated, a corporation of New York Application February 19, 1944, Serial No. 523,105

12 Claims. (Cl. 252—242)

This invention has to do with apparatus for conducting reactions of fluid reactants such as hydrocarbon vapors, oxygen, air, etc., in the presence of a substantially continuous moving column or bed of contact mass material which may or may not be catalytic to the desired reaction. Exemplary of the processes of this kind is the cracking conversion of hydrocarbons, it being well known that hydrocarbons of gas oil nature boiling between about 500° F. and about 750° F. may be substantially cracked to gasoline by passing them at reaction conditions of temperature and pressure such as, for example, temperatures of the order of 800° F. and higher at pressures usually somewhat above atmospheric in contact with a solid adsorptive catalytic contact mass. Usually such contact masses partake of the nature of fuller's earth, or other natural or treated filtering clays and/or various synthetic associations of alumina, silica or alumina and silica, any of which may or may not have other constituents added for a purpose in connection with the processes such as certain metallic oxides. In a most recent form this operation has been developed as one in which the particle form solid contact material passes cyclically through zones or vessels in the first of which the cracking reaction takes place, usually at some super-atmospheric pressure, and in the second of which the contaminant materials formed upon the contact mass by the reaction are burned off usually at super-atmospheric pressure by means of a fluid regenerating medium such as a combustion supporting gas. In this cyclic process the particle form contact material passes through both reactor and regenerator vessels as a substantially continuous column of moving contact mass material. In the regeneration vessel considerable quantities of heat are released by the combustion of the contaminant deposited on the particle form contact material flowing therethrough, which tends to materially increase the temperature level of said contact material. It is of the utmost importance in the regeneration of particle form contact material that the temperature thereof be maintained at or above a level that will support combustion of the contaminant deposit and below a level that would cause heat damage to the contact material. Consequently, it is usually necessary to provide in the construction of the regeneration vessel an adequate means for removal of heat from the contact material flowing therethrough.

This invention has to do with a method and apparatus for regenerating particle form contact mass material moving through a regeneration zone as a substantialy compact column of contact mass material while controlling the temperature of said contact mass material within desired limits without the use of heat transfer tubes or the like and circulating head transfer medium systems in the process.

A major object of this invention is the provision of a method and apparatus wherein contaminant deposit is burned from a substantially continuous column or bed of particle form contact material, passing through said regenerator, by the action of a combustion supporting gas and wherein the excess heat liberated by contaminant combustion is simultaneously removed from the contact material and from the regenerator by use of an adequate excess of relatively low temperature combustion supporting gas, or admixture thereof with inert gas, thereby permitting the maintenance of the contact material during the regeneration at a temperature above that required to support contaminant combustion and below that which would cause heat damage to the contact material. It is a further object to provide an apparatus of the type above described through which the required quantity of combustion and cooling vapors may be passed at a very low pressure drop thereby greatly reducing the operating cost of such a regenerator. These and other objects of this invention will become apparent in the following discussion of this invention.

Figure 2:
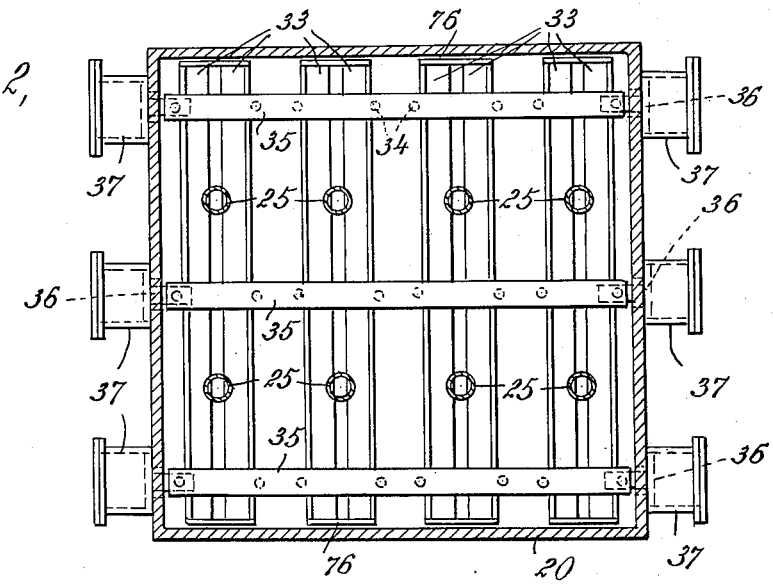
Figure 3:
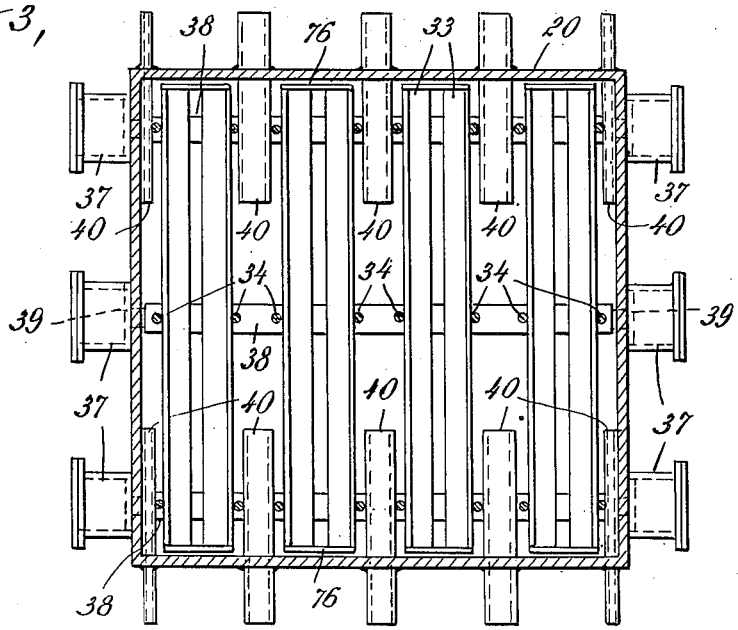
Figure 11:
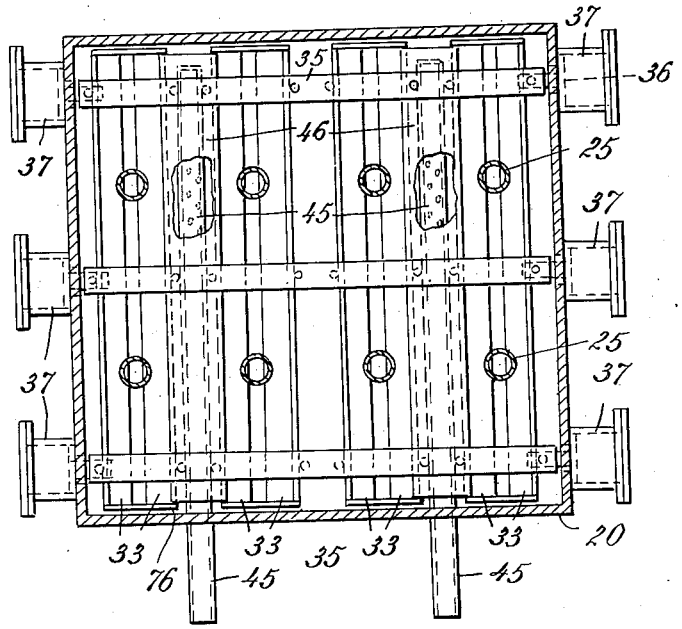
Figure 12:
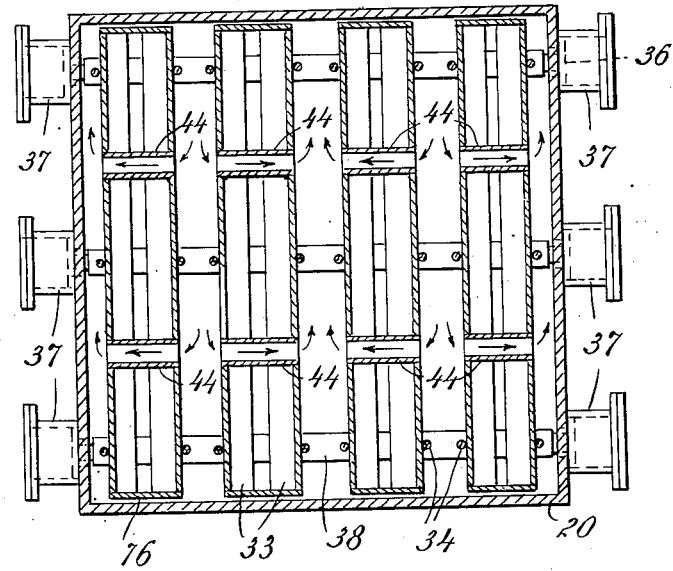

In order to readily understand this invention reference should be made to the drawings attached hereto of which Figure 1 shows an elevation view, partially in section, of such a regenerator; Figures 2 and 3 show sectional plan views of this regenerator and Figures 4–9 inclusive show design details of several types of baffles for use therein. Figure 10 shows an elevation view, partially in section, of an alternate construction of such a regenerator providing for two pass flow of the gas; Figures 11 and 12 are sectional plan views of this regenerator. In Figure 13 is shown an elevation view, partially in section, of a preferable design of such regenerator providing for split flow of the combustion and cooling gases. Figure 14 is a sectional plan view of this regenerator. Figures 15 and 16 show side and end views of a similar regenerator providing for bi-directional horizontal vapor flow. Figure 17 shows a sectional plan view of this regenerator and Figure 18 is an elevational view, partially in section thereof. All these drawings are diagrammatic in character.

Turning to Figures 1, 2 and 3 which should be read together, we find 20 is the shell confining the contact material feed zone and burning zones of the regenerator and 30 is the shell confining the tapered contact material drain section therefrom. The regenerator shell shown is of roughly square cross-section but the principles of construction entailed apply equally well to regenerators of other cross-sections. The contact material feed zone is comprised of a contact material surge section 62 and a gas outlet section 63 which are separated by plate 23 supported from the shell by braces 24. Attached to the plate 23 are a number of pipes 25, open on both ends and extending down through the gas outlet section 63 to the tops of the several contact material columns in the burning zone which will be hereinafter described. Contact material passes to the surge zone 62 through the top thereof by means of pipe 26 and then passes through pipes 25 to the burning zone.

The burning zone of the regenerator is comprised of a plurality of adjacent parallel alternate contact material and gas passageways, 64 and 65 respectively. These passageways are formed by a novel arrangement of a number of angle shaped baffles 33 which extend the width of the regenerator. In Figure 4 is shown a detail study of the arrangement of baffles confining a typical contact material passageway. Advantage is taken of the fact that particle-form solids on the surface of substantially continuous beds of stationary or flowing particle form solid material tend to form a surface angle of repose which is characteristic of the nature of the solid material involved. For particle form contact material of the type used for cracking contact masses, this surface angle of repose ranges from about 30° to 40° with the horizontal. Thus if the contact material is diverted away from the vertical confining wall of a passage by means of a baffle such as the sloping sides of the angle baffles 33 shown in Figure 4, considerable open space may be left in the vertical confining wall without danger of contact material escaping therethrough. The baffles 33 are so spaced one above another as to leave such an open space and so that the top of the vertical sides of said baffles are above the surface of the contact material forming the edge surfaces 67 of the passageway. Thus there is formed a confined zigzag passage for contact material flow in which passage the continuously interchanging particles of contact material on the surface edges 67 are in continuous intimate contact with the combustion gas flowing in adjacent passages. The air passages also extend the width of the kiln in one direction and their width in the other direction is fixed by the spacing of the sets of baffles 33 defining the several contact material passages. In some instances relatively little gas passage cross-section is required in which case the angle baffles are set so closely as to partially interlock thereby forming zigzag gas passages. This is shown in Figure 5.

Other types of baffles and arrangements thereof which serve the same function and work on the same principle as those above described may be used. For example in Figure 6 is shown an arrangement of flat sloping plates so placed as to define a zig-zag contact material passageway in which there are numerous edge surfaces 67 in contact with the gas from adjacent passages. Such baffles may also be arranged as shown in Figure 7. Here the plate baffles 33 forming the two confining walls of the contact material passage are so arranged as to result in alternate expansion and contraction of the cross-sectional area of said passageway along its entire length. With this modification of the baffle arrangement, the contact material passageway should be very narrow in order to permit adequate exposure of all the contact material particles to combustion gas. For this reason it is usually a less preferable form of the invention.

Another modification of baffle arrangement is shown in Figures 8 and 9 in which the baffles consist of large vertically set plates in which are punched numerous louvers, thereby forming the contact material deflection baffles 43 and interpassage gas communication spaces 66. For simplicity of construction, it is generally preferable that the several confined contact material passageways be arranged in straight parallel rows as shown above but other arrangements are also possible. For example, the baffles may be circular rather than straight along their lengths thereby forming a number of circular concentric alternate contact material and gas passageways. In the construction of all the above baffles, the sloping, contact material diverting side thereof should form an angle of about 30° or greater with the horizontal in order to permit proper flow of the contact material thereabove.

Returning again to Figures 1–3, inclusive, we find that the baffles 33 are supported by rods 34 which are in turn supported on lower and upper ends by connection to horizontal pipes 35 and 38 respectively. These pipes are supported from the regenerator shell by means of sleeves 36 and 39 which can be easily installed or withdrawn through nozzles 37. Vertical plates 76 extending the length of the burning section are attached to the ends of the baffles 33 so as to prevent escape of contact material from the contact material passageway into the gas passageway around the ends of the baffles 33.

At the lower end of the burning zone are the gas inlet pipes 40 open on each end and extending through opposite sides of the regenerator shell into the several gas passageways. Due to the low pressure drop characteristics made possible in this design the burning and cooling gas, usually air, may be drawn in through these feed pipes and up through the air passageways 65 into the outlet chamber 63 and out through outlet pipe 27 into stack 28, by the natural draft caused by this stack. The quantity of air pulled through the regenerator may be controlled either by damper 29 in the stack or by means of throttle valves (not shown) on the ends of the air inlet pipes 40. If desired, the stack may be eliminated and air charged to the regenerator by means of a gas blower or compressor. In some operations it may be desirable to introduce the air at the upper end of the air passageways and withdraw it at the lower end thereby obtaining concurrent flow of gases and contact material. This may be done by simply changing the external connections to the air outlet and inlet pipes shown.

The operation of such a regenerator is unusually simple. Spent contact material from the hydrocarbon reaction vessel at a temperature usually sufficient to support combustion of the contaminant deposit is continuously charged to the regenerator surge zone through pipe 26. The contact material surge zone 62 is of sufficient size to eliminate the danger of the contact material level falling below the top of the burning zone due to minor changes or interruptions in the rate of contact material flow to and from the regenerator. The contact material then passes through the pipes 25 to the tops of the several contact material passageways 64 and then flows as a substantially continuous column of particle form material in a zigzag path down through the burning zone. The zigzag method of flow causes the continuous inter-changing of contact material particles exposed to the combustion air at the numerous edge surfaces 67.

This insures uniform exposure of all the contact material particles to the combustion supporting and heat removing gas and a resulting uniform removal of contaminant and excess heat from combustion thereof from all the contact material. Moreover, the continuous exposure, withdrawal, and re-exposure of the contact material to combustion gas at surfaces 67 tends to prevent the overheating of individual particles by a too rapid combustion and also prevents the formation of localized zones of overheated contact material. This is very important since, due to the low pressure drop characteristics of the apparatus substantially no transverse flow of combustion or cooling gas through the contact material columns in the contact material passageways occurs and substantially all the contact of contact material with the combustion and cooling gas occurs at the surfaces 67. The regenerated contact material passes from the bottom of the regenerator through pipe 31 and valve 32 by which the rate of contact material flow is regulated.

A quantity of air considerably in excess of that required for contaminant combustion and at a temperature considerably below that of the contact material in the burning zone enters through pipes 40 into the lower end of the air passageways and is heated in its passage up through the regenerator, thereby removing the excess heat from contaminant combustion and thereby preventing the overheating of the contact material. Part of this air also serves to support the combustion of the contaminant deposit.

The contact material temperature in the burning zone may be thus controlled within the desired ranges by simply controlling the rate of air flow through the regenerator. Moreover, if desired, quantities of low temperature inert gas such as flue gas may be passed through the regenerator along with sufficient combustion air thereby not only accomplishing the removal of the excess heat of contaminant combustion but also controlling the rate of burning of the deposit.

The vertical rows of baffles 33 may be so arranged as to allow an air passageway cross-sectional area such that the pressure drop due to the required operating quantity of gas flow will be very low (of the order of 2" or less water per foot of vapor gas passage elevation).

A preferable modification of the regenerator is shown in Figures 10–12, inclusive, which should be read together. In these figures are drawings of a regenerator similar to that shown in Figure 1 except for changes in gas connections. Low temperature air enters this regenerator through pipes 45 which extend across the top of alternate air passageways. These pipes are open to the atmosphere and closed on the ends within the regenerator. Uniformly spaced holes or slots on the length of the pipes within the air passageways permit air to be drawn uniformly into the tops of these passages. The air passes downward through alternate passageways and then passes across to air passages on the opposite sides of the contact material passageways through jumper pipes 44 placed across the bottom of the contact material passageways. The air is then drawn up through these passageways into the outlet section 63 and out through pipes 27 to the stacks 28. This arrangement forces the air to make two passes through the regenerator instead of one thereby causing it to be more nearly heated to the contact material temperature. This expedient not only decreases the total cooling gas requirements but also allows control of more uniform contact material temperatures throughout the length of the regenerator. That is, by the passage of both cold and heated air past the contact material in the upper part of the regenerator, the tendency, sometimes encountered in regenerators employing unidirectional air flow of cooling the contact material at the air inlet end of the regenerator to lower temperatures than are desirable, is overcome. The apparatus of Figure 10 may be modified by placing troughs and withdrawal pipes connected to the bottom thereof under each contact material passageway at the lower end thereof. The withdrawal pipes would terminate within the upper section of the conical drain section 30 and deliver contact material thereto. By this modification, a gas distribution chamber would be provided between said draw-off pipes and elevationally between the lower end of said pipes and the upper end thereof. This gas distribution space would serve the same purpose as the jump over pipes 44 in Figure 10, and said pipes could be eliminated.

The regenerator of Figure 10 may also be designed so as to permit the desired flow of combustion and cooling gas therethrough at extremely low pressure drops; so as to permit contact of contact material and air substantially only at the surfaces 67.

Another preferable modification of gas inlet and outlet arrangement is shown in Figures 13 and 14 in which Figure 13 shows an elevation view of a regenerator and Figure 14 shows a sectional view taken just above the gas inlet manifold. The regenerator is similar to that shown in Figure 1 except as regards the gas connections and contact material inlet details. In this modification cold air enters through the open manifold 52 and pipes 53 into the gas passageways approximately at the elevational center of the burning zone. The air flow then divides, part passing upward through the air passageways into the outlet zone 63 and out to the stack 28 through pipe 49, and part passing downward through the air passageways and out through the pipes 54 and manifold 50 to the stack 28. The pipes 54 are similar to the inlet pipes 53, extending across the passageways, having uniformly spaced slots or holes drilled therein. This modification of gas flow permits better control of uniform contact material temperature through the length of the burning zone not only by reason of splitting the air stream but also by reason of the possible individual control of the quantity of air passed through the lower and upper halves of the regenerator. This is made possible by means of dampers 48 and 51 in the gas outlet pipes 49 and 50, respectively.

Still another modification of gas connections is shown in Figures 15–18 inclusive in which Figures 15 and 16 show side and end views of a regenerator. Figure 17 shows a sectional plan view thereof taken at line 17—17 in Figure 15 and Figure 18 is an elevational view, partially in section, of this regenerator taken along line 18—18 of Figure 17. This regenerator is also similar to that shown in Figure 1 except for modification in dimensions and gas inlet and outlet connections. The gas is passed horizontally across the gas passageways, the direction of gas flow being opposite in horizontal direction in alternate gas passageways. Thus gas is drawn into alternate gas passageways on opposite sides of the regenerator through rectangular ducts 58 which are open on both ends and extend the height of the gas passageways. The gas then passes across to the opposite side of the regenerator and out through outlet ducts 57, connecting ducts 56 and 55 and stacks 28.

As can be seen in Figure 18, baffle plates 71 are placed across the top of the gas passageways between the regenerator shell 21 and the top of baffles 33 of the contact material passageways, thereby preventing the by-passing of the gas over the top of said passageways. As can also be seen from Figure 18, the contact material is charged to the regenerator through pipe 26 onto an accumulation of contact material directly over the burning zone. The material flows directly to the several contact material passageways and is prevented from entering the top of the gas passageways by baffles 71.

The ducts 57 and 58 extend through the shell of the regenerator and are attached thereto by means of flanges 59 and 60, respectively, as shown in Figure 16. This modification also permits better control of uniform contact material temperature throughout the burning zone.

The baffles 33 may be so arranged as to cause very low pressure drops due to normal gas flow through the gas passageways.

In all the above modifications of this invention the same principles of construction and operation are involved, and the same broad limits of design and operation apply. The rate of contact material and gas flow and the overall regenerator dimension are largely dependent upon the size and type of contact material the type and amount of contaminant deposit on said material and the operation temperature and pressure limitations characteristic to the particular cyclic system and contact materials involved.

Generally, contact material vertical passageway lengths of the order of 15 to 40 feet have been found practical and these passageways extend the width of the regenerator in one direction.

The thickness of these contact material passageways may best be expressed in terms of the maximum distance of any particle from a gas contacting surface; said gas contacting surfaces being the edge surfaces 67 between superposed baffles. This dimension is especially important since substantially all the burning occurs at or near the surfaces 67. Broadly, the contact material columns in said passageways may be as great as will permit substantially all the contact material particles in said column to be exposed a sufficient number of times to the edge surfaces 67 to insure removal of contaminant deposit by combustion. It will become apparent from this that the allowable thickness of contact material column is to some extent tied up with the vertical length of the column and with the rate of contact material flow and the nature of the regeneration reaction. As a broad range of limits which have been found to best define the more practical and more satisfactory operation of our invention the maximum distance of any particle of contact material from a gas contacting surface may be between 1 to 18 inches. As a preferred limit, the maximum distance of any particle of contact material in the contact material passageway from a gas contacting surface should be between 2 to 8 inches. It should be understood that operation outside these limits is possible within our invention but less desirable.

The desired pressure drop through the gas passageways is obtained by allowance of the proper spacing between the plurality of rows of contact material passageways confined by the baffles 33 for the gas rates which will be required to burn the contaminant and to control the temperature of the contact material above the temperature that will support contaminant combustion and below the temperature which would be detrimental to the contact material in the particular cyclic operation involved. We have found it desirable and practical to space the baffles 33 so as to permit the proper amount of gas flow through the regenerator at a total pressure drop of the order of 0.5 to 1 inch of water and lower.

All the foregoing illustration of the construction and operation of the apparatus of this invention are intended to be merely exemplary and illustrative in character and are in no way intended to limit either the scope or application of this apparatus except as hereinafter limited by the claims. It is apparent that the above apparatus may be used as a reaction vessel as well as a regenerator.

I claim:

1. A process for conducting regeneration of a particle-form solid contact mass material by burning of a contaminant deposit thereon with a combustion supporting gas comprising: flowing said particle-form solid contact material and said combustion supporting gas through a confined regeneration zone in a plurality of independent alternate gas and solid streams, maintaining each of said solid streams in substantially free contact at a plurality of surfaces along two longitudinal opposite boundaries thereof with a solid particle-free gas stream, each of said solid streams being a laterally confined, upright, substantially compact column of particle-form solid gravitating downwardly in a zigzag fashion so as to continuously interchange solid particles within said column with those at said plurality of surfaces, continuously replenishing said columns at their upper ends with contaminant bearing material and continuously withdrawing regenerated contact material from the lower ends of said columns at such a rate as to maintain said columns filled and as to insure adequate burning of the contaminant deposit, continuously supplying combustion supporting gas at a controlled rate and temperature along one of the vertically extending extremities of alternate members of said gas streams, flowing said gas in a substantially horizontal direction in said alternate members of said gas streams, withdrawing gas from the opposite vertically extending extremity of each of said gas streams, continuously supplying combustion supporting gas at a controlled rate and temperature to the remaining gas streams along those vertically extending extremities which are adjacent the extremities of gas withdrawal in said first named alternate gas streams, flowing said gas in said last named remaining gas streams in a substantially horizontal direction opposite to the direction of flow in said first named gas streams, withdrawing gas from the opposite vertically extending extremities of said last named gas streams, said controlled rate and temperature of gas supply to said streams being such as to support combustion of said contaminant and to remove as increased sensible heat in the effluent gas at least most of the heat liberated by said combustion.

2. A method for regenerating contaminant bearing particle-form contact material which comprises: maintaining a plurality of horizontally spaced apart, parallel, laterally confined substantially compact, upright columns of downwardly gravitating contact material particles within a confined regeneration zone so as to provide passages for gas flow between said columns, flowing a stream combustion supporting gas through alternate members of said gas passages in one direction and flowing a stream of combustion supporting gas through each of the remaining gas passages in the opposite direction so that the gas flows in opposite directions all along two opposite sides of each contact material column, maintaining each of said columns in substantially free contact with said gas streams at a plurality of locations along said two opposite sides of said column, controlling the rate of supply of said combustion supporting gas to said passages between said columns of contact material in excess of that required for complete combustion and further controlling the rate of supply and inlet temperature of said combustion supporting gas to provide for carrying away at least most of the exothermic heat liberated by contaminant combustion as increased sensible heat of the effluent gas streams while maintaining the contact material above a minimum temperature below which contaminant will not be burned and below a maximum temperature at which the contact material will be damaged, supplying spent contaminant bearing contact material to the upper ends of said columns, withdrawing contact material from the lower ends of said columns and controlling the contact material withdrawal at a rate which will insure adequate removal of contaminant deposits.

3. A method for burning contaminant deposits from a particle form contact mass material by the action of a combustion supporting gas comprising: flowing particle form contact mass material containing a contaminant deposit and a combustion supporting gas through a combustion zone in a plurality of separate, parallel, alternate solid and gas streams, maintaining each of said solid streams in substantially free contact along two opposite longitudinal boundaries thereof with one of said gas streams, each of said solid streams being a laterally confined, substantially compact, upright column of contact material gravitating downwardly in a zigzag path so as to continuously interchange contact material particles within said column with those at said opposite boundaries thereof, continuously replenishing said contact mass material columns with contact mass material at the upper ends thereof and continuously withdrawing contact mass material from the bottom of said columns at such a rate as to maintain the columns substantially filled; continuously supplying combustion supporting gas to the upper ends of alternate members of said gas streams and flowing it downwardly in said streams, withdrawing gas from each of said alternate gas streams and directing the gas from each of said alternate gas streams into the lower end of one of the remaining alternate gas streams without causing said gas to flow through any intervening solid stream, passing the gas upwardly in said last named alternate gas streams, withdrawing gas from the upper ends of said last named gas streams, and controlling the rate and temperature of combustion supporting gas supply to said gas streams such as will support the combustion of said contaminant on said contact material and remove at least most of the heat liberated thereby as increased sensible heat in the effluent gas, while maintaining the contact mass material above a minimum temperature below which the contaminant will not be burned and below a maximum temperature at which the contact mass material will be damaged.

4. An apparatus according to claim 10 characterized in that said gas inlet openings to said gas flow passages and said gas outlet openings therefrom are located on opposite vertical extremities of said passages, the inlet and outlet for each successive gas flow passage being reversed in location so that the gas flows in opposite vertical directions in successive gas flow passages.

5. A contact material regeneration apparatus which comprises: a substantially vertical shell, within said shell a plurality of spaced apart, parallel, vertical partitions extending across and throughout a major portion of the length of said shell and terminating short of the lower end thereof and adapted to define a plurality of side-by-side alternate vertically extending, zigzag solid flow passages and gas flow passages, the passage defining partitions having louvre type openings distributed over their area which openings are adapted to exclude gravity flow of solids therethrough, means to supply particle form contact material to the upper ends of said solid flow passages, a closure across the upper end of each of said gas flow passages, a receiving basin on the lower end of said shell to receive solid flow from said solid flow passages, an outlet conduit for solid withdrawal from said receiving basin, flow throttling means associated with said outlet conduit, a separate gas inlet opening through said shell extending along most of the vertical height of one of the horizontal extremities of each of said gas flow passages, a separate gas outlet duct connected through said shell and extending through most of the height of the opposite horizontal extremity of each of said gas flow passages, the gas inlet openings and outlet ducts for successive gas flow passages positioned across said shell being reversed in position so as to provide for horizontal gas flow in opposite directions on opposite sides of any given solid flow passage, at least one stack outside of said shell and manifolding connecting said gas outlet ducts to said stack.

6. A contact material regeneration apparatus which comprises: a substantially vertical vessel, within said vessel a plurality of substantially vertical parallel rows of angle shaped members extending horizontally the width of said vessel, said angle members having an included angle between their sides greater than 120° and being spaced apart one above the other with one side of each angle being vertical and the other side extending downwardly partially across the space between rows in opposite directions in alternate vertical rows of angle members so as to define a number of alternate side by side zigzag passages and straight passages extending horizontally the width of said vessel and upwardly and downwardly throughout a major portion of the vertical length of said vessel, said angle members in each row being further spaced in such a way that a line extended from the lower edge of a sloping side of one angle member to the upper edge of the vertical side of the angle member next below forms an angle with the horizontal of less than about 30°, members defining a passage for solid material supply to the upper ends of only the zigzag solid flow passages, a plurality of gas flow ducts connecting into corresponding extremities of said gas flow passages, a separate one of said ducts connecting into one extremity of each gas flow passage and communicating it with a point outside of said vessel, the interiors of ducts connecting to adjacent gas flow passages being out of communication with each other, a manifold outside of said vessel connecting into only those ducts communicating with alternate members of said gas flow passages, said manifold being out of communication with the ducts connecting into the remaining alternate members of the gas flow passages, similar ducts similarly connecting into the opposite extremities of said gas flow passages and a manifold outside of said vessel connecting into only those of the last named ducts which connect into said remaining alternate members of the gas flow passages, whereby the manifolds on opposite sides of said vessel communicate through the ducts with different alternate members of the gas passages.

7. An apparatus for conducting the burning regeneration of contaminant bearing particle form contact materials which comprises: a vessel adapted to enclose a regeneration zone, members forming within said vessel a plurality of substantially vertical parallel partitions which extend horizontally the width of said vessel in one direction and which extend vertically throughout a major portion of the length of said vessel, said partitions being spaced apart to provide a plurality of side by side, alternate solid flow passages and gas flow passages which extend vertically throughout a major portion of the length of said vessel and horizontally the width of said vessel and said partitions having foraminate areas therein adapted to provide for gas flow therethrough but to restrict gravity flow of solid particles therethrough, solid inlet means adapted to supply solid material into the upper sections of only said passages for solid flow, means to withdraw solid material from the lower section of said vessel, a closure across the top of each of said gas flow passages, a plurality of gas outlet members connecting along one side of said vessel into corresponding vertically extending ends of alternate members of said gas flow passages, one gas outlet member connecting separately into one vertical end of each of said passages, a plurality of gas inlets, a separate one of said gas inlets opening directly into the end of each of the remaining gas flow passages on the same side of said vessel as said gas outlet members, said gas outlet members being out of communication with said gas inlets except through the solid flow passages, similar gas outlet members and gas inlets communicating the opposite ends of the gas flow passages on the opposite side of said vessel, one of said last named gas outlet members connecting separately into each gas passage having a gas inlet on its opposite end and one of said last named gas inlets opening directly into the end of each gas flow passage into which a gas outlet member connects on the opposite end.

8. An apparatus for regeneration of contact materials comprising an elongated vertical vessel having a downwardly tapered bottom, an outlet conduit connected to said bottom and a flow throttling device on said conduit, a plurality of members positioned within said vessel to define a plurality of substantially parallel alternate zigzag solid contact material flow passages and gas flow passages extending vertically through a major portion of the length of said vessel and terminating short of the ends thereof, said members being positioned to provide a plurality of horizontally extending openings spaced at intervals along the boundaries of said passages, said openings being adapted to substantially exclude gravity flow of solid particles therethrough, a partition extending transversely across the upper section of said vessel above said passages to define a solid material supply chamber within the upper end of said vessel spaced above said passages, spaced conduits extending downwardly from said partition and terminating within the upper section of said zigzag passages for solid flow thereby providing a gas space around the conduits and above the upper ends of said gas flow and solid flow passages, closure members across the upper ends of alternate members of said gas flow passages, a separate gas inlet to each of said alternate gas flow passages, said inlets being located near the upper ends of said gas flow passages and below said closure members, a gas flow conduit connected into said vessel below said supply chamber but above said gas flow and solid flow passages, and at least one conduit extending across the lower section of each of said passages for solid flow to communicate the passages for gas flow positioned on either side of said passage for solid flow.

9. An apparatus for conducting the regeneration of contaminant bearing particle form contact materials which comprises: an elongated vertical vessel, members forming within said vessel a plurality of substantially vertical, parallel partitions which extend horizontally the width of said vessel in one direction and which extend vertically throughout a major portion of the length of said vessel but terminate short of the end thereof, said partitions being spaced apart to provide a plurality of side by side alternate solid flow passages and gas flow passages which extend vertically throughout a major portion of the length of said vessel and horizontally the width of said vessel and said partitions having foraminate areas therein adapted to permit gas flow therethrough while restricting gravity flow of solid particles therethrough, solid feed conduits extending downwardly within an upper portion of said vessel and terminating within the upper section of said solid flow passages thereby providing a gas space within the upper section of said vessel surrounding said conduits and above said gas and solid flow passages, conduit means to withdraw solid material from the lower end of said vessel, closure members across the upper ends of alternate members of the gas flow passages, a separate gas flow conduit connected into the upper section of each of said alternate members of the gas flow passages below the closure member, a gas flow conduit connected into said gas space in the upper section of said vessel at a level above the upper ends of said gas flow and solid flow passages, and members defining confined passages for gas flow extending across the lower sections of said solid flow passages to communicate the gas flow passages on either side thereof.

10. An apparatus for conducting the burning regeneration of contaminant bearing particle form contact materials which comprises: a vessel adapted to enclose a regeneration zone, members forming within said vessel a plurality of substantially vertical parallel partitions which extend horizontally the width of said vessel in one direction and which extend vertically throughout a major portion of the length of said vessel, said partitions being spaced apart to provide a plurality of side by side, alternate solid flow passages and gas flow passages which extend vertically throughout a major portion of the length of said vessel and horizontally the width of said vessel, and said partitions having foraminate areas therein adapted to provide for gas flow therethrough but to restrict gravity flow of solid particles therethrough, solid inlet means adapted to supply solid material into the upper sections of only said passages for solid flow, means to withdraw solid material from the lower section of said vessel, a separate gas inlet opening near only one extremity of each of alternate members of the gas flow passages, said alternate members of the gas flow passages having said gas inlet openings near corresponding extremities of said passages, means to supply gas to said openings, a separate gas outlet opening near only the extremity of each of the remaining alternate members of the gas flow passages corresponding to the gas inlet extremity of said first named alternate gas flow passages, an external stack and passage defining means communicating said stack only with said gas outlet openings, a separate gas outlet opening near only the extremity of each of said first named alternate members of the gas flow passages which is opposite the gas inlet opening thereto and a separate gas inlet opening near only the extremity of each of said last named alternate members of the gas flow passages which is opposite the gas outlet opening thereto.

11. The process of claim 2 characterized in that the direction of gas flow is vertical and opposite in direction along opposite sides of each of said columns of contact material within said regeneration zone.

12. A method for burning contaminant deposits from a particle form contact mass material by the action of a combustion supporting gas comprising: flowing spent particle form contact mass material and combustion supporting gas through a burning zone in a plurality of substantially upright, independent non-intersecting contact material streams and a plurality of gas streams interspaced between said contact material streams of which the solid streams are laterally confined substantially compact columns of downwardly gravitating particle form contact mass material which are continuously replenished with contaminant bearing contact material at their upper ends while regenerated particle form contact mass material is continuously withdrawn from the bottoms thereof at such a rate as to maintain the columns substantially filled, and of which the gaseous streams are substantially free of contact mass material; maintaining each of said columns of contact mass material in substantially free contact at and near each of two opposite longitudinal surfaces with one of said gaseous streams; continuously supplying combustion supporting gas at a temperature below that of the contact material in said columns and at a rate in excess of the quantity required for complete combustion of the contaminant deposited on the contact mass material; continuously withdrawing gas from said gaseous streams; controlling the direction of gas flow opposite in alternate members of said gas streams whereby the columns are subjected to gas existing at different temperatures along portions of their opposite longitudinal surfaces; further controlling the rate of supply and inlet temperature of said combustion supporting gas to accomplish removal of at least most of the exothermic heat liberated by contaminant combustion as increased sensible heat of the effluent gas streams, while maintaining the contact mass material above a minimum temperature below which contaminant will not be burned and below a maximum temperature at which the contact mass material will be heat damaged; causing said contact material in said columns to flow downwardly in a zigzag path so as to continuously interchange contact mass material particles within said columns with those at said longitudinal surfaces exposed to said gas streams whereby any difference in the particle temperature in various portions of the column cross section is minimized by continuous mixing and remixing of the particles; and controlling the rate of contact mass material withdrawal from the bottom of said columns at a rate which will insure adequate removal of the contaminant deposits.

LOUIS P. EVANS.

REFERENCES CITED

The following references are of record in the file of this patent:

UNITED STATES PATENTS

| Number | Name | Date |
|---|---|---|
| 293,133 | Applegate | Feb. 5, 1884 |
| 640,715 | Stoveken | Jan. 2, 1900 |
| 1,150,996 | Carr | Aug. 24, 1915 |
| 1,446,857 | Peiter | Feb. 27, 1923 |
| 1,562,550 | Hall | Nov. 24, 1925 |
| 1,918,367 | Ackermann | July 18, 1933 |
| 2,226,535 | Payne | Dec. 30, 1940 |
| 2,227,416 | Payne | Dec. 31, 1940 |
| 2,286,654 | Simpson et al. | June 16, 1942 |
| 2,320,562 | Bransky | June 1, 1943 |
| 2,330,710 | Hemminger | Sept. 28, 1943 |
| 2,331,433 | Simpson et al. | Oct. 12, 1943 |
| 2,417,393 | Evans | Mar. 11, 1947 |
| 2,419,245 | Arveson | Apr. 22, 1947 |

FOREIGN PATENTS

| Number | Country | Date |
|---|---|---|
| 479,158 | Germany | July 9, 1929 |
| 499,034 | Germany | June 4, 1930 |

Certificate of Correction

Patent No. 2,458,356.

January 4, 1949.

LOUIS P. EVANS

It is hereby certified that errors appear in the printed specification of the above numbered patent requiring correction as follows:

Column 2, line 5, for the word "head" read *heat*; line 49, for "vapor" read *gas*; column 4, line 63, for "gases" read *gas*; column 5, line 61, strike out "vapor"; column 8, line 52, claim 1, after "bearing" insert *contact*; column 9, line 73, claim 3, after "stream" and before the comma, insert *in contact with the solid particles*; and that the said Letters Patent should be read with these corrections therein that the same may conform to the record of the case in the Patent Office.

Signed and sealed this 7th day of June, A. D. 1949.

[SEAL]

THOMAS F. MURPHY,
*Assistant Commissioner of Patents.*